United States Patent [19]
Jordan

[11] Patent Number: 4,849,177
[45] Date of Patent: Jul. 18, 1989

[54] REAGENT PACK AND CAROUSEL

[75] Inventor: Willie W. Jordan, Garland, Tex.
[73] Assignee: Abbott Laboratories, North Chicago, Ill.

[21] Appl. No.: 47,737
[22] Filed: May 8, 1987
[51] Int. Cl.⁴ ............ G01N 21/07
[52] U.S. Cl. ............ 422/64; 422/65; 422/67; 422/72; 422/101; 422/102; 422/104; 422/300; 436/45; 436/165; 436/177; 436/809; 206/558; 206/561; 206/564; 206/521.7; 211/77
[58] Field of Search ............ 206/558, 561, 564, 569, 206/521.7; 211/74, 77, 78; 422/63-65, 67, 72, 101, 102, 104, 300; 436/45, 165, 177, 808, 809

[56] References Cited

U.S. PATENT DOCUMENTS

| | | | |
|---|---|---|---|
| D. 273,807 | 5/1984 | Holen | D24/56 |
| D. 273,987 | 5/1984 | Holen et al. . | |
| D. 285,118 | 8/1986 | Huang . | |
| D. 287,633 | 1/1987 | Hollar et al. . | |
| D. 289,199 | 4/1987 | Tag et al. . | |
| 3,081,158 | 3/1963 | Winter | 422/64 |
| 3,785,773 | 1/1974 | Rohrbaugh | 422/102 |
| 3,897,216 | 7/1975 | Jones | 422/104 |
| 4,126,418 | 11/1978 | Krasnow | 422/64 |
| 4,235,840 | 11/1980 | Mendoza et al. | 422/64 |
| 4,287,155 | 9/1981 | Tersteeg et al. | 422/64 |
| 4,298,570 | 11/1981 | Lillig et al. | 422/64 |
| 4,322,216 | 3/1982 | Lillig et al. | 23/230 |
| 4,360,360 | 11/1982 | Chiknas | 422/64 X |
| 4,456,581 | 6/1984 | Edelmann et al. | 422/72 |
| 4,510,119 | 4/1985 | Hevey | 422/104 X |
| 4,515,753 | 5/1985 | Smith et al. | 422/102 |
| 4,608,231 | 8/1986 | Witty et al. | 422/61 |
| 4,675,299 | 6/1987 | Witty et al. | 356/246 X |
| 4,678,752 | 7/1987 | Thorne et al. | 435/291 |

FOREIGN PATENT DOCUMENTS

| | | | |
|---|---|---|---|
| 1012259 | 12/1965 | United Kingdom | 211/74 |

OTHER PUBLICATIONS

Abbott TDx System Operation Manual, published in 1984 (pp. 3.0-3.09).

*Primary Examiner*—Barry S. Richman
*Assistant Examiner*—Lynn Kummert
*Attorney, Agent, or Firm*—Roberta L. Hastreiter; Clifford A. Dean

[57] ABSTRACT

A multiple dose reagent pack and corresponding carousel for an automated analyzer are disclosed. The reagent pack contains a plurality of vial-receiving wells which receive and hold a plurality of reagent-containing vials to form a unitary reagent pack. The carousel contains a plurality of radially spaced compartments which are adapted to receive and hold either a reagent pack or a sample container. A corresponding plurality of reaction container openings are provided on the carousel. Reagent packs for specific assays can be selectively interspersed with sample containers in the compartments to provide a wide variety of test combinations.

30 Claims, 3 Drawing Sheets

REAGENT PACK AND CAROUSEL

FIELD OF THE INVENTION

This invention relates generally to carriers for transporting containers of fluids such as reagents or biological samples and to diagnostic instrument components designed to retain the carriers in close proximity to the area where an immunoassay using the transported fluid is conducted. More specifically, this invention relates to a pack that carries multiple reagent containers and to a carousel adapted to receive and hold such packs and biological sample containers for use by an automated clinical analyzer in conducting immunoassays.

BACKGROUND OF THE INVENTION

Typically, samples of bodily fluids such as serum, plasma, urine, and the like, are assayed for the presence of analytes such as drugs, viruses, or bacteria by reacting the samples according to a specific test protocol with specific reagents which are selected to identify a particular analyte. The protocol specifies the sequence in which sample and reagents are to be introduced, the timing for the introduction of sample and reagents, the volumes of each to be used, and other conditions to be controlled, such as temperature. The resulting reaction mixture is typically allowed to incubate for a predetermined time and is then read, optically or otherwise, to determine the presence and concentration of the specific analyte which the assay is designed to identify. In general, processes and apparatuses for preparing and reading immunoassays are well known.

Automated clinical analyzers are capable of performing immunoassays on an entire batch of samples simultaneously. In some types of known analyzers, such as the well-known TDx® Clinical Analyzer manufactured by Abbott Laboratories of North Chicago, Ill., a batch of sample containers are mounted radially about a rotatable carousel together with a corresponding number of reaction containers. The carousel is then mounted inside the analyzer. Inside the analyzer, the carousel rotates stepwise to move each corresponding sample container and reaction container pair first to a position adjacent a preparation station, and then to a second position adjacent a reading station. A mechanical apparatus having pipetting means and typically operating under program control is located in proximity to the preparation station. Also located in proximity to the preparation station are a plurality of reagent containers which contain the reagents required to perform a specific immunoassay on the batch of samples contained in the sample containers. The reagent containers may be individual containers or may be configured as an integrated pack.

At the preparation station, the mechanical apparatus and pipetting means operate to access and transfer volumes of sample from a sample container and reagents from the reagent containers into a reaction container according to the protocol established for the specific assay. When the mechanical apparatus completes the preparation of the reaction mixture according to the test protocol, the carousel rotates, positioning the next corresponding sample container and reaction container pair adjacent the preparation station, and moving the previous pair toward the reading station. Known carousels typically hold between 20 and 25 containers.

One limitation of a number of these analyzers is that they are capable of performing only one assay at a time on each batch of samples on the carousel. In order to perform a different assay, it is necessary to physically remove the reagent containers either individually or as a pack from the analyzer and replace them with different reagent containers or a different pack for the assay to be run. The requirement of changing reagent packs for each assay has an adverse impact on the throughput of the analyzer. Where multiple assays are to be performed on the same batch of samples or on different samples, the requirement of changing reagent containers for each assay has an even more severe adverse impact on the throughput of the system. Decreased throughput increases both the time and cost associated with such assays.

One approach to solving this problem of some known analyzers has been to provide unit dose or unitized reagent containers each containing an aliquot or reagents sufficient to carry out a specific assay on one sample. These containers are mounted on the analyzer carousel in positions corresponding to each sample container. With utilized reagent containers, different immunoassays can be carried out on each sample. For example, one sample can be assayed for a certain class of drugs, the next for the presence of a strain of virus, the next for a certain class of bacteria, and so forth.

The unit dose approach has not provided a completely satisfactory solution to the problems of the prior art. First, it is relatively expensive to manufacture and use unit dose containers, which are limited to use with one sample. Second, it is time consuming. This drawback is particularly noticeable where only one or a small number of different assays are to be conducted on the samples in a particular batch. With the relatively large number of sample and unit dose reagent containers that must be mounted on each carousel, the risk of inaccurate delivery of a sample to a specific unitized reagent container is increased. This increases the risk of performing the wrong test on a sample.

In view of the foregoing limitations and drawbacks of the prior art, it is the primary objective of the present invention to provide a multiple dose reagent pack which can be expediently mounted on a carousel with a plurality of sample containers to provide reagents for conducting immunoassays of a plurality of such samples. It is a related object to provide a carousel which is adapted to hold a plurality of such multiple dose reagent packs interspersed with such sample containers to flexibly provide reagents for performing the same or different assays on the same or different samples. It is a significant advantage of the invention that flexibility is provided to perform a selected plurality of different assays on the same or different samples and to selectably vary the number of different assays performed on each sample while maintaining high throughput levels and reducing the requirement for physical interaction with the analyzer and the carousel.

SUMMARY OF THE INVENTION

The present invention seeks to overcome the foregoing limitations and drawbacks associated with the prior art by providing a multiple-dose reagent pack and a carousel for an automated clinical analyzer adapted to hold such packs together with a plurality of conventional sample containers which contain samples to be assayed by the analyzer.

In one aspect, the invention comprises a reagent pack which includes a vial carrier having a plurality of vial receiving wells for containing a corresponding plurality of multiple-dose reagent-containing vials. In another aspect, the invention comprises a carousel for use with such reagent packs in an automated clinical analyzer. The carousel includes a base for rotatably mounting the carousel in the analyzer and a rack which is connected to the base and which has a plurality of predetermined mounting positions which are adapted to releasably mount the reagent packs in selected positions.

BRIEF DESCRIPTION OF THE DRAWINGS

The features which are believed to characterize the invention are set forth in the appended claims. The invention itself, together with its features, objects, and attendant advantages, will be best understood by reference to the following detailed description of a presently preferred embodiment thereof, taken in conjunction with the accompanying drawings, in which:

DETAILED DESCRIPTION OF THE PRESENTLY PREFERRED EMBODIMENTS

Figure 1:
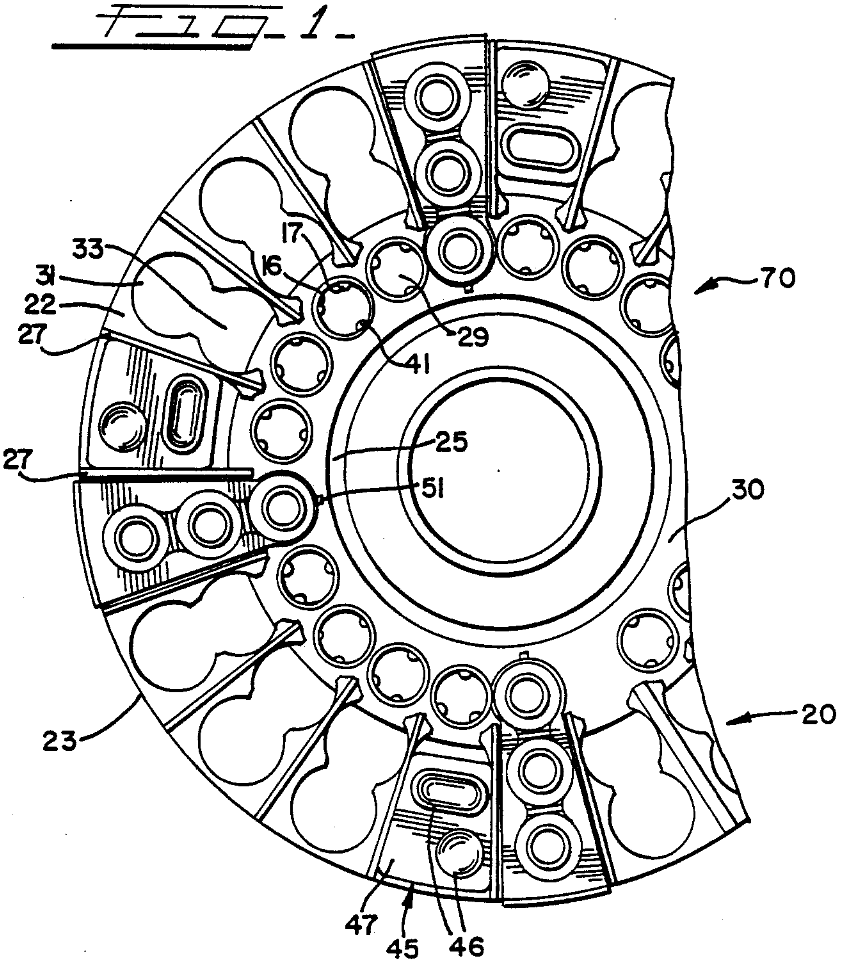
FIG. 1 is a partial plan view of a preferred embodiment of the carousel and reagent pack of the present invention illustrating representative reagent packs and sample containers mounted in the carousel.

Referring to the drawings, FIGS. 2 through 6 illustrate two preferred embodiments of the multiple dose reagent pack of the invention. Referring to both embodiments, the preferred reagent pack of the invention comprises in combination a vial carrier 50 and a plurality of reagent-containing vials 40 which are removably mountable therein. The vial carrier 50 is preferably manufactured of a suitable plastic such as an ABS or SAN plastic by conventional plastic molding techniques.

Figure 3:
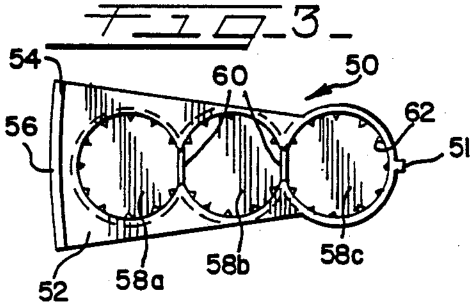
FIG. 3 is a plan view illustrating a preferred three vial embodiment of the reagent pack of the present invention.
Figure 4:
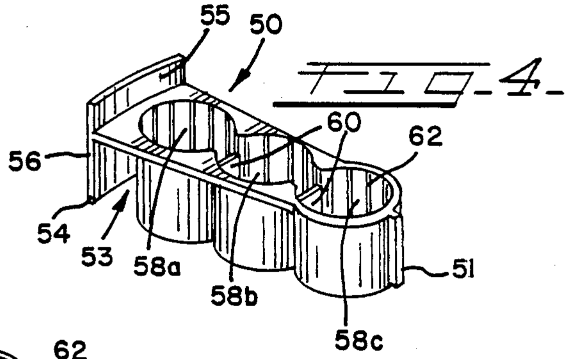
FIG. 4 is a perspective view illustrating the three vial embodiment of the reagent pack of the present invention.
Figure 5:
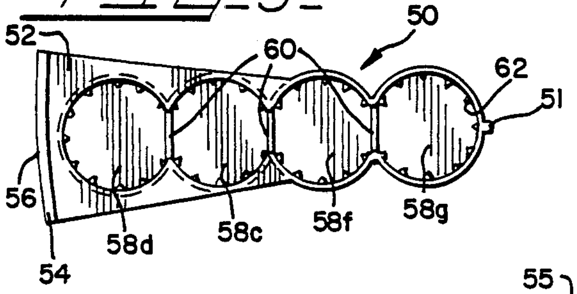
FIG. 5 is a plan view illustrating a preferred four vial embodiment of the reagent pack of the present invention.

Referring to FIGS. 3 and 4, one preferred embodiment of the vial carrier 50 has three cylindrical vial receiving wells 58*a–c*. A second preferred embodiment has four such wells 58*d–g*. Each well 58*a–g* has a plurality of inwardly protruding vertical ribs 62 radially spaced about the inner wall thereof. The ribs 62 are adapted to provide a secure press fit with the outside surface of a vial 40 when the vial 40 is mounted in the well 58*a–g*. The wells 58*a–c* and 58*d–g* are preferably arranged such that their centers are co-linear for reasons which will become apparent below. The wells 58*a–c* and 58*d–g* are also preferably arranged such that adjacent wells slightly overlap. Vertical, linear dividing walls 60 are provided to separate the adjacent wells. The linear dividing walls 60 slightly restrict the otherwise circular cross-sectional area of each of the wells function to press the outer surface of each vial 40 mounted in a well 58*a–g* into pressing contact with each of the ribs 62 to provide a secure press fit therewith.

Figure 6:
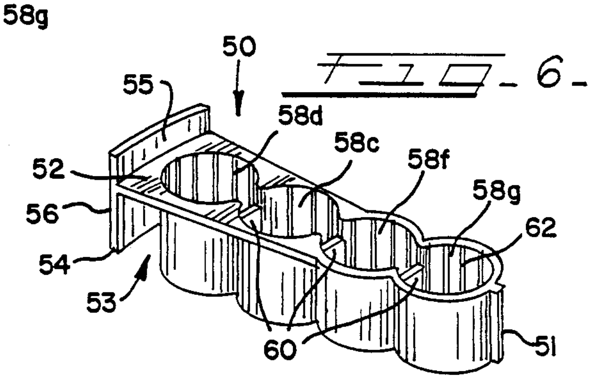
FIG. 6 is a perspective view of the four vial embodiment of the reagent pack of the present invention.
Figure 8:
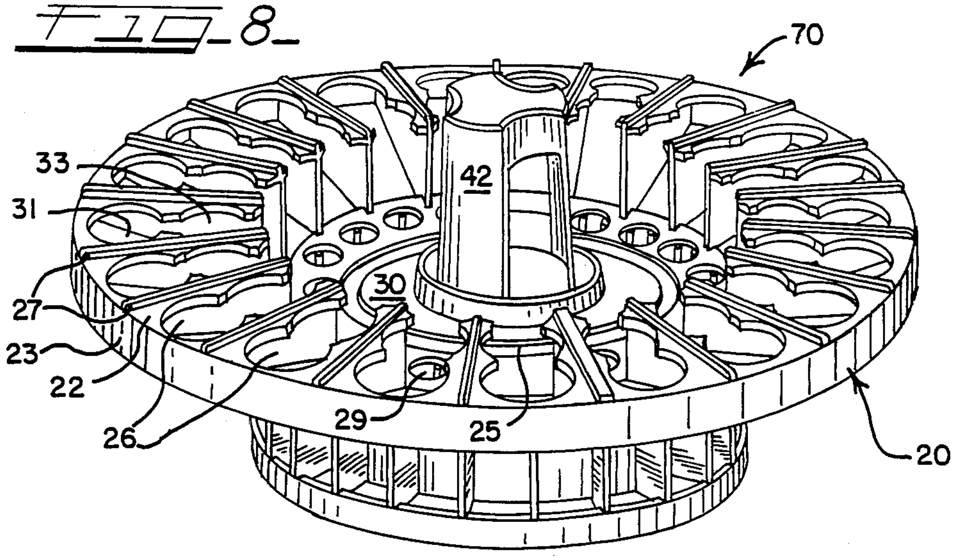
FIG. 8 is a perspective view of a preferred embodiment of the carousel of the invention.

A curved vertical retaining wall 54 is connected to the wells in each embodiment by a thin horizontal shelf 52. The radius of the retaining wall 54 preferably is approximately equal to the radius of the outside rim of the corresponding carousel 70 which is described in detail below. The shelf 52, which is preferably coplaner with the open tops of the wells, diverges outwardly, starting at the third well 58*c*, 58*f*, from the retaining wall 54 symmetrically on both sides of the wells as illustrated in FIGS. 4 and 6. The shelf 52 extends in the direction of a line through the centers of the wells a sufficient distance beyond the well 58*a*, 58*d* nearest the retaining wall 54 to form a gap 53 therebetween. The shelf 52 preferably intersects the retaining wall 54 a short distance below the top thereof, thereby forming a tab 55. Both the tab 55 and the shelf 52 provide convenient means for handling the reagent pack 50 without touching the vials 40, thus minimizing the risk of contamination of reagents in the vials 40 by a human operator. The shelf 52, retaining wall 54, and a gap 53 also cooperate with the carousel 70 as described in detail below to securely support and hold the reagent pack 50 therein.

Referring to FIGS. 3–6, the vial carrier 50 includes a projecting vertical ridge 51 at the inner end of the well 58*c*, 58*g* furthest from the retaining wall 54. The ridge 51 prevents the inadvertent reverse placement of the carrier 50 in the carousel 70 by providing an offset between the wells 58*a–c* and 58*d–g* of the carrier 50 and corresponding openings of the carousel 70, which is described below, so that the carrier 50 will not correctly engage the carousel 70 in a reverse position. It will be appreciated by those skilled in the art that other structures may also be used to provide an offset. For example, a "Y" shaped or "V" shaped ridge could be provided to generate an offset at two points with respect to the openings of the carousel 70 instead of one.

The outer surface 56 of the vertical retaining wall 54 and tab 55 provides a location for labelling means which preferably includes both operator readable identifying information in the form of graphics or alphanumeric designations, for example, and analyzer readable information such as an optical bar code. The labelling means is advantageously used to identify to the operator and the analyzer the assay which the reagent pack 50 is intended to perform. The labelling means also provides a convenient means for tracking a test sample through the entire analysis procedure with the analyzer instrument.

Figure 2:
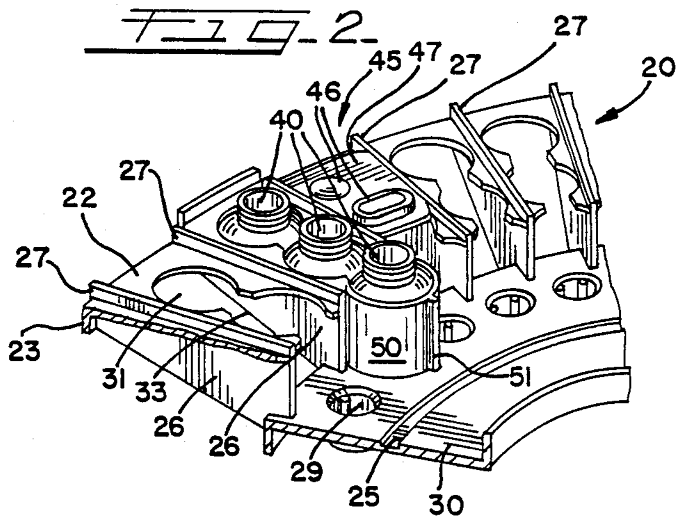
FIG. 2 is a partial perspective view in cross section of a preferred embodiment of a carousel and reagent pack of the present invention showing a reagent pack and sample container mounted in the carousel.

In both preferred embodiments, the wells 58*a–c* and 58*d–g* are adapted to hold plastic reagent-containing containing vials, similar to the vial 40 partially illustrated in perspective in FIG. 2. The vials 40 are preferably formed at minimal cost of a thin, flexible plastic by conventional plastic molding techniques. Alternatively glass or other vials can be used. The vials 40 are generally cylindrical in shape and have a vertical dimension sufficient to elevate the neck and opening of the vial 40 above the opening of a well 58*a–g* for ease of access when the vial 40 is mounted in the well 58*a–g*. Each vial 40 preferably has a capacity of approximately 2.5 milliliters of a selected reagent, which is typically sufficient to perform assays on approximately 50 samples. The vials 40 are suitably provided with conventional threaded or capped closures, and may, after being opened, be resealed with a vial seal such as the vial seal described in the co-pending application entitled "Vial Seal" which was filed in the name of Walter Jordan on the same date as this application and which is commonly assigned with this application. Although it would be possible to form the vials 40 integrally with the vial carrier 50, it is preferred that the two components be embodied separately. Separate vials 40 are easier to fill and avoid the risk of contaminating the reagent in one vial with reagents from adjacent vials during the filling process. Also, in the preferred embodiment, both the vials 40 and the carrier 50 are disposable as a single unit when the reagents in the vials 40 are expended.

With the foregoing preferred embodiments, a supplier of reagents can economically provide reagents for specific assays to the operator of an automated analyzer in a convenient unitary reagent pack. Thus, for example, the operator can purchase reagent packs for cocaine or other drug tests, and the packs received by the user will contain all the necessary reagents for each desired assay already present in vials 40 mounted in a carrier 50.

Generally, the three vial embodiment of the reagent pack is best suited for use in assays of the type requiring a pretreatment reagent usually used to unbind the analyte of interest from certain proteins in the sample, and analyte compliment for binding the unbound analyte, and a specifically tagged or labelled tracer reagent for indicating the presence of the analyte of interest. Each of the required reagents is contained in one of the vials 40 of the reagent pack.

The four vial embodiment is particularly well suited for use in certain assays of the type described above but which are particularly sensitive to carryover of any reagent, for example by pipetting means of an analyzer, from one reagent vial to another. Examples include assays for marijuana, cocaine, and amphetamines. For such assays, the fourth vial of the pack is advantageously provided to contain a wash or buffer reagent that can be used to rinse the pipetting means after it accesses each reagent.

Additional features and advantages of the invention are provided by a carousel 70 for an automated analyzer as illustrated in FIGS. 1, 2, 8, and 9. The carousel 70 is advantageously adapted to receive and hold a selected plurality of reagent packs 50 of the invention in selected positions of the carousel 70 interspersed with sample containers containing samples to be tested. The carousel 70 also provides means for ensuring that a reagent pack 50 can be mounted therein in but a single predetermined orientation. As described previously, ridge 51 precludes reagent pack 50 from reverse placement in the carousel 70. Thus, the operator of an analyzer adapted to operate with the corresponding reagent pack 50 and carousel 70, can simply purchase or otherwise obtain a reagent pack for a cocaine test, for example, mount it directly into the carousel 70, and be assured that the appropriate reagents are present and arranged in the appropriate positions required by the analyzer to automatically perform the desired assay. The preferred carousel 70 also includes means to receive and hold a plurality of reaction containers. As will be seen, many testing combinations are thereby made possible and a great deal of flexibility is thereby provided.

The carousel 70 generally comprises a circular rack 20 and a central base or support 30 which preferably are integrally formed of a suitable plastic such as ABS or SAN plastic using conventional plastic molding techniques. The rack 20 comprises a plurality of vertical dividing walls 26 which extend radially from the periphery of the central base 30 at regular intervals. Each dividing wall 26 is connected to the adjacent dividing walls by a horizontal support surface 22 which has a circular periphery and which is integrally formed with the rack 20. The support surface 22 extends between the adjacent dividing walls 26 at a vertical elevation such that a small portion 27 of each wall 26 extends vertically above the support surface 22. A downwardly oriented, vertical edge or rim 23 is formed around the periphery of the support surface 22.

The dividing walls 26, together with the support surface 22, vertically extending portions 27, and base 30 form a plurality of radially diverging compartments, each defining a mounting position on the carousel 70. Each compartment has a diverging lateral dimension corresponding to the diverging lateral dimension of the shelf 52 of a reagent pack 50. In each compartment, the support surface 52 has formed therein two generally circular, slightly overlapping openings 31 and 33 which correspond to and which are adapted to receive two of the vial receiving wells of a reagent pack 50. When a reagent pack 50 is mounted in a compartment, the two vial receiving wells 58*a–b*, 58*d–e* closet to the curved retaining wall 54 of the reagent pack 50 are captivated in the openings 31 and 33 and prevented from moving laterally or radially. The vial receiving well or wells furthest from the retaining wall 54 are supported on the top surface of the central base 30. In a three vial reagent pack the base 30 supports one well 58*c*. In a four vial reagent pack, the base 30 supports two wells 58*f–g*. The gap 53 between the retaining wall 54 and the nearest vial receiving well 58*a*, 58*d* of the reagent pack 50 provides clearance for the portion of the support surface 22 between the opening 31 and outer edge 23. The curved retaining wall 54 extends over and around the curved outer edge 23 of the support surface 22 and the two elements together with the gap 53 cooperate to prevent the reagent pack 50 from moving radially. The support surface 22 supports the bottom surface of the shelf 52 of the reagent pack 50. The diverging edges of the shelf 52 fit between and preferably abut the radially extending vertical sections 27 of the rack to facilitate mounting of a reagent pack 50 in a compartment and to prevent lateral movement of the pack 50 within the compartment. As previously mentioned, the ridge 51 on each reagent pack 50 provides an offset which prevents the reagent pack 50 from being mounted in a compartment with the ridge 51 facing toward the periphery of the rack 20. Thus in the preferred embodiment, the reagent pack 50 can only be mounted in a single orientation with the ridge 51 directed toward the central base 30.

It is understood that the carousel 70 could be constructed with vial carriers formed integrally in predetermined compartments of the rack 20. However, such construction reduces the flexibility provided by the invention and is not preferred.

The carousel 70 illustrated in FIGS. 1, 2, 8, and 9 includes a circular recess 25 formed on the central base 30. The recess 25 provides an advantageous location for the placement of identifying indicia such as a raised number (not shown) for each carousel position. Duplicate indicia (not shown) may also be provided along the periphery of the rack 20 between the openings 31 and the outer edge 23. In an alternative embodiment (not shown), the recess 25 may be replaced by a vertical barrier to allow mounting of three vial reagent packs while preventing the mounting of four vial packs.

Figure 9:
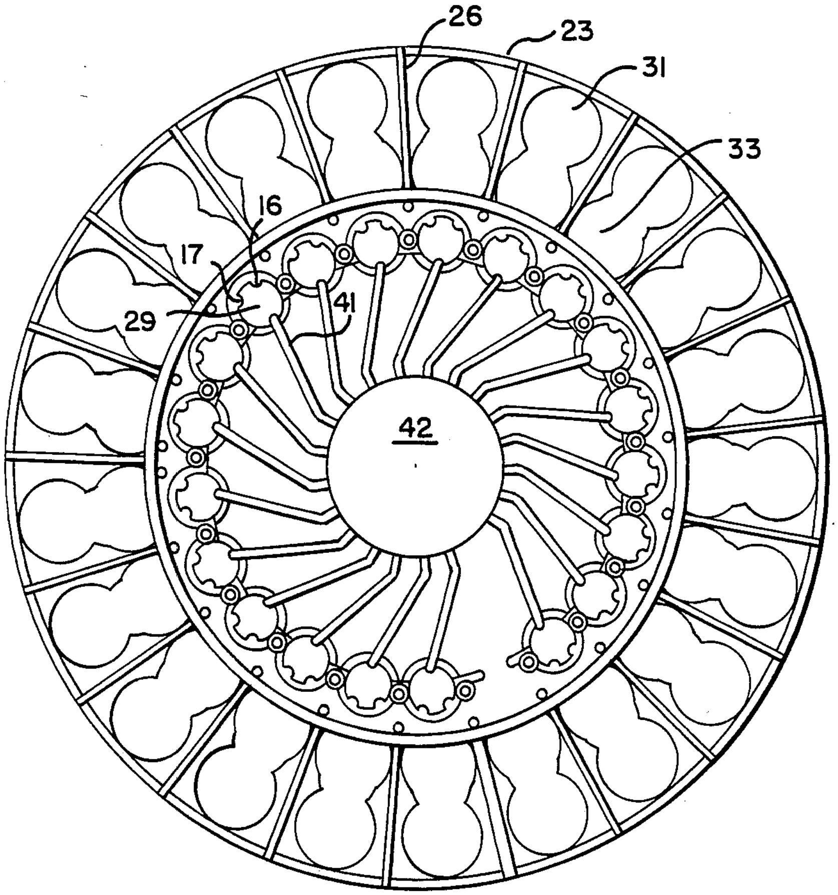
FIG. 9 is a bottom view in section of the carousel.

The base 30 also has formed therein a plurality of reaction container receiving openings 29 corresponding in number to the number of rack compartments. The openings 29 radially spaced at regular intervals around the base 24 and the center of each opening 29 is aligned with the centers of the openings 31 and 33 of a corresponding rack compartment. Each opening 29 has formed in the inner surface thereof at least two fixed retaining projections 16 and 17. A locking mechanism comprised of a plurality of spaced spring fingers 41 corresponding to the number of openings 29 is integrally formed with a handle 42 of the carousel 70. The handle and locking mechanism are rotatably mounted on the base 30 so that the fingers 41 rotate when the handle 42 is moved. As seen in FIGS. 1 and 9, when a finger 41 is rotated to a position opposite projections 16, 17 the finger 41 functions to press the outer surface of a reaction container, which may be a conventional cuvette, into contact with the projections 16, 17 of the opening 29 to establish a secure press fit of the cuvette within the opening 29. The fingers 41 may also be rotated away from the openings 29 to allow insertion and removal of reaction containers. The fingers 41 preferably have the same construction as the fingers which perform the same function on the well known Abbott TDx® carousel.

When a reagent pack 50 is mounted in a compartment of the rack 20, at least one of the vial receiving wells 58 sits over and covers the corresponding reaction container opening 29 so that no reaction container can be mounted in that mounting position of the carousel 70. In addition, as shown in FIGS. 1 and 9, the carousel 70 preferably has one mounting position that does not include a corresponding opening 29. This position defines a reference position for the analyzer which indicates that all samples have been tested.

Figure 7:
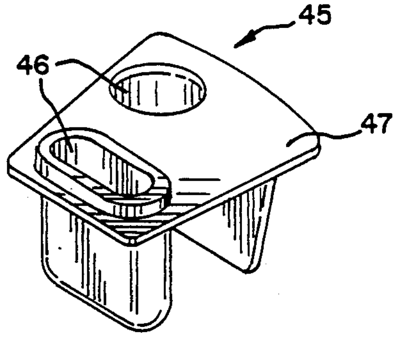
FIG. 7 is a perspective view illustrating a sample container preferred for use with the carousel of the present invention.

In addition to reagent packs, each compartment is also adapted to alternatively receive and hold a sample container adapted to contain a sample to be tested. In particular, the opening 31 and 33 of each compartment are preferably adapted to hold sample cups 45 of the type illustrated in FIG. 7 and in U.S. Pat. No. Des. 273,807 which issued to Holen on May 8, 1984. The preferred sample cups 45, like the preferred reagent pack 50, have sample-receiving wells 46 which are received within and held by the openings 31 and 33, a diverging shelf 47 which is supported by the support surface 22 of the rack, and diverging lateral sides which allow each cup 45 to be mounted in a compartment with a single, predetermined orientation. The sample cups 45 are thus held and secured against lateral and radial movement in the rack compartments similarly to the reagent packs 50 except that the sample cups 45 do not extend over the outer edge 23 of the rack 20.

The underside of the base 30 of the carousel 70 is provided with a conventional support spindle receiving well (not shown) and a plurality of conventional drive slots (not shown) which are arranged radially around the circumference thereof. Such a well and such drive slots are well known to those skilled in the art and are commonly found on carousels of the type utilized in such well known automated analyzers as the Abbott TDx® analyzer. As is well known, the receiving well mounts the carousel 70 for rotation on a stationary spindle in the analyzer. The drive slotsd mate with a drive mechanism such as the teeth of a pinion gear attached to a stepper motor of the analyzer to rotate the carousel 70 and there by index each compartment between an assay preparation position and an assay reading position within the analyzer. Although the carousel drive and support elements of a typical automated analyzer have been briefly described to identify the environment of the carousel, these elements and the analyzer itself are beyond the scope of and do not form a part of the present invention.

It should be apparent from the foregoing description of the preferred reagent packs 50 and corresponding carousel 70 that the invention provides a great deal of flexibility and many possible testing combinations. For example, reagent packs for cocaine, amphetamine, barbituate, and marijuana tests can be mounted in selected compartments of the rack with, for example, four compartments separating each pack as shown in FIG. 1. Although FIG. 1 shows only one sample cup per reagent pack for purposes of illustration, four sample cups containing samples of the same or of different groups of four persons could be selectively mounted in each of the four compartments adjacent the specific reagent packs. An entire battery of drug tests could then automatically carried out on the same or different four person groups.

As another example, four identical reagent packs for a certain viral test can be mounted on the carousel in selected compartments with samples of different persons being mounted in intermediate compartments in the manner described above to automatically carry out an assay for the same virus on an entire batch of samples. Many other arrangements and combinations exist.

What have been described are various aspects of certain reagent packs and a corresponding carousel which constitute presently preferred embodiments of the invention. It is understood that the foregoing description and accompanying illustrations are merely exemplary and are not to be taken as limitations on the scope of the invention, which is defined solely by the appended claims and their equivalents. Various changes and modifications to the preferred embodiments will be apparent to those skilled in the art. Such changes and modifications can be made without departing from the spirit and scope of the invention. Accordingly, it is intended that all such changes and modifications be covered by the appended claims and their equivalents.

I claim:

1. A multiple dose reagent pack for use in an automated analyzer having a carousel with rack means including a plurality of predetermined mounting positions, each position including a plurality of reagent pack receiving openings, wherein the improvement comprises:

reagent container carrier means comprising a plurality of container receiving wells for holding reagent containers, at least some of said wells being formed to correspond to said reagent pack receiving openings, said rack means comprising a pluratlity of predetermined mounting positions, so that said reagent pack is mountable in selected mounting positions of said rack means; said plurality of container receiving wells being arranged such that adjacent wells are in mutually overlapping relationship;

a plurality of container means for holding multiple doses of selected reagents mounted in said plurality of container receiving wells; and support means for supporting said reagent pack for mounting on said carousel rack means with said at least some of said container receiving wells mounted in said reagent pack receiving openings.

2. The reagent pack of claim 1 wherein each of said plurality of container receiving wells comprises means for establishing a press fit with the container means mounted therein.

3. The reagent pack of claim 1 wherein said plurality of container receiving wells are arranged colinearly.

4. The reagent pack of claim 1 wherein said plurality of container receiving wells are arranged such that adjacent wells are in mutually overlapping relationship.

5. The reagent pack of claim 1 including linear dividing means connected between said mutually overlapping adjacent wells to separate said wells, said linear dividing means serving to provide a press fit between each said well and said container means seated therein.

6. The reagent pack of claim 1 including tab means for facilitating handling of the reagent pack.

7. The reagent pack of claim 1 including curved retaining means for restricting radial movement of said reagent pack when mounted in a mounting position of said carousel rack means.

8. The reagent pack of claim 7 wherein said retaining means includes label receiving means for attaching an identifying label thereto.

9. The reagent pack of claim 8 wherein said identifying label includes an optical bar code.

10. The reagent pack of claim 1 including means connected to said carrier means for restricting mounting of said reagent pack to a single predetermined orientation in said carousel.

11. The reagent pack of claim 10 wherein said means connected to said carrier means comprises a vertical ridge connected to provide a radial offset for said reagent pack.

12. A reagent delivery system for use in an automated analyzer, comprising:

a carousel, comprising:

base means for rotatably mounting said carousel in an analyzer; and rack means connected to said base means having a plurality of individual compartments each of which defines a predetermined rack mounting position and each of which comprises a plurality of reagent pack receiving openings; and a multiple dose reagent pack, comprising:

reagent container carrier means comprising a plurality of container receiving well for holding reagent containers, at least some of said wells being formed to correspond to said reagent pack receiving openings so that said reagent pack is mountable in selected rack mounting positions of said carousel; said plurality of container receiving wells being arranged such that adjacent wells are in mutually overlapping relationship;

a plurality of container means for holding multiple doses of selected reagents mounted in said plurality of container receiving wells; and support means for supporting said reagent pack for mounting on said carousel with said at least some of said container receiving wells mounted in said reagent pack receiving openings.

13. The carousel of claim 12 wherein said rack means includes means for allowing releasable mounting of said multiple dose reagent pack in a single predetermined orientation.

14. The carousel of claim 12 including a corresponding plurality of reaction container holding means formed in said base means in alignment with said plurality of predetermined rack mounting positions.

15. The reagent pack of claim 12 wherein each of said receiving wells comprises means for establishing a press fit with the container means seated therein.

16. The reagent pack of claim 12 wherein said plurality of container receiving wells are arranged colinearly.

17. The reagent pack of claim 12 wherein said plurality of container receiving wells are arranged such that adjacent wells are in muturally overlapping relationship.

18. The reagent pack of claim 12 including linear dividing means connected between said mutually overlapping adjacent wells to separate said wells, said linear dividing means serving to provide a press fit between each said well and said container means seated therein.

19. The reagent pack of claim 12 including tab means for facilitating handling of the reagent pack.

20. The reagent pack of claim 12 including curved retaining means for restricting radial movement of said reagent pack when mounted in a mounting position of said carousel means.

21. The reagent pack of claim 20 wherein said retaining means includes label receiving means for attaching an identifying label thereto.

22. The reagent pack of claim 21 wherein said identifying label includes an optical bar code.

23. The reagent pack of claim 12 including means connected to said carrier means for restricting mounting of said reagent pack to a single predetermined orientation in said carousel.

24. The reagent pack of claim 23 wherein said means connected to said carrier means comprises a vertical ridge connected to provide a radial offset for said reagent pack.

25. A multiple dose reagent pack for use in an automated analyzer, comprising:

a plurality of cylindrical vial receiving wells positioned adjacent one another in a linear array and in mutually overlapping relationship to form a reagent pack;

a shelf extending horizontally from one end of said linear array of vial receiving wells to an other end of said linear array of vial receiving wells; and a retaining wall attached to, and extending vertically from, said shelf, forming a gap between said one end and said retaining wall, said gap being positioned and arranged for receiving a portion of the analyzer to retain said reagent pack on the analyzer.

26. The reagent pack as recited in claim 25 wherein each of said vial receiving wells comprises a well into which a reagent container is securely mounted.

27. The reagent pack as recited in claim 26 wherein said wells are separated by linear dividing means to restrict the cross sectional area of each of said adjacent wells to provide secure mounting of a reagent container therein.

28. The reagent pack of claim 25 further including an optical bar code located on a surface of said retaining wall oriented away from said one end.

29. The reagent pack of claim 25 further including means for preventing the reverse mounting of said reagent pack in a carousel.

30. The reagent pack of claim 29 wherein said preventing means includes a vertical ridge on the other end of said linear array.

* * * * *

UNITED STATES PATENT AND TRADEMARK OFFICE

CERTIFICATE OF CORRECTION

PATENT NO. : 4,849,177

DATED : July 18, 1989

INVENTOR(S) : W. W. Jordan

It is certified that error appears in the above-identified patent and that said Letters Patent is hereby corrected as shown below:

Column 4, Line 58, delete "containing".

Column 8, Line 26, add --be-- after "automatically".

Column 8:
Claim 1, Line 62, change "pluratlity" to --plurality--.

Column 9:
Claim 12, Line 52, change "well" to --wells--.

Column 10:
Claim 17, Line 3, change "muturally" to --mutually--.

Signed and Sealed this

Seventh Day of January, 1992

*Attest:*

HARRY F. MANBECK, JR.

*Attesting Officer*

*Commissioner of Patents and Trademarks*